United States Patent [19]

Tanashian

[11] Patent Number: 5,245,735
[45] Date of Patent: Sep. 21, 1993

[54] SHARED FOOT PEDAL SWITCH ASSEMBLY FOR FLEXIBLE SHAFT POWER TOOLS

[76] Inventor: Hagop Tanashian, 515 E. Altamonte Dr., #14, Altamonte Springs, Fla. 32701

[21] Appl. No.: 849,752

[22] Filed: Mar. 12, 1992

[51] Int. Cl.⁵ .............................................. B23B 39/16
[52] U.S. Cl. ................................. 29/26 A; 51/170 R; 408/127
[58] Field of Search ............... 29/26 A, 26 B; 30/276; 408/3, 127; 51/170 R, 170 T, 170 PT; 409/175, 181, 182

[56] References Cited

U.S. PATENT DOCUMENTS 560,171   5/1896   Oehring ............................. 408/127
1,918,952 7/1933   Bachmann et al. ............... 51/170 R
4,137,589 2/1979   Sukhraj ............................. 51/170 T
4,872,788 10/1989  Koese ............................. 408/127 X

FOREIGN PATENT DOCUMENTS 2358884  5/1975  Fed. Rep. of Germany .......... 408/3

Primary Examiner—Z. R. Bilinsky
Attorney, Agent, or Firm—Warren L. Franz

[57] ABSTRACT

The flexible shaft cables of a plurality of power tools pass through recesses of a switch assembly having a plurality of spring-loaded switching elements respectively extending into the recesses. Lifting the cable of a selected tool out of its recess, actuates the associated switching element to automatically connect the selected tool for actuation by a common foot pedal.

10 Claims, 2 Drawing Sheets

SHARED FOOT PEDAL SWITCH ASSEMBLY FOR FLEXIBLE SHAFT POWER TOOLS

This invention relates to a switch assembly for enabling the powering of a plurality of flexible shaft power tools using a common foot pedal.

BACKGROUND OF THE INVENTION

Flexible shaft power tools of the type to which the invention applies are, for example, conventionally used by jewelers and diamond setters. Such users have need at their workbenches for a plurality of power driven devices, such as drills, cutters, sanders and polishers. Such need is met by tools having foot pedal actuated motors that drive rotary bits mounted on remote ends of flexible shafts. The separate functions are provided either by interchanging different bits on a single power tool unit, or by utilizing different single bits on a plurality of tool units. A common arrangement is hang the motor in an elevated position above the work bench, so that a tool cable containing the flexible shaft hangs down to position the bit for convenient availability adjacent the work surface. The foot pedal is, of course, located under the bench. Where a plurality of tool units is used, a separate foot pedal is electrically connected between each tool motor and a wall outlet power source.

For commercial stone setting operations, the use of interchangeable bits to provide the desired drilling, cutting, sanding and polishing functions with a single flexible shaft power tool is impractical. Too much productive time is wasted changing bits, to make the use of a single tool feasible for high volume operations. Consequently, a more advantageous arrangement is to utilize a plurality of tools, dedicating one tool to each of the commonly needed functions. A three tool arrangement, for example, might have a drill bit attached to one tool for drilling; a knife head attached to a second tool for cutting; and a sandpaper bit attached to yet another tool for cleaning the casting. A five tool arrangement might have five tools, one carrying a round drill bit; a second with a knife drill; a third with a cup bit; a fourth with a sandpaper bit; and a fifth with a rubber/plastic polishing bit. The multi-tool, dedicated arrangement has the drawback, however, that each tool requires its own foot pedal. This not only clutters up the work area, but tires and confuses the user by requiring constant shifting of positions and determining which pedal operates which tool.

SUMMARY OF THE INVENTION

It is an object of the present invention to provide a switch assembly for enabling the powering of a plurality of flexible shaft power tools using a common foot pedal.

In accordance with the invention, a plurality of power tool motors, each connected for driving a respective flexible shaft having an associated shaft-driven bit, is electrically connected through a shaft cable-actuated switch assembly for selective actuation using a single, common foot pedal. In a preferred embodiment of the invention, described in greater detail below, the switch assembly comprises a housing including a plurality of recesses for respectively receiving the tool shaft cables. A spring-loaded switch arm is located in each recess, so that when a particular cable is removed from its recess, the motor associated with that cable is automatically electrically connected to the foot pedal, and when that cable is returned to the recess. The motor is disconnected from the pedal.

The invention makes it possible to avoid the delay of changing bits in stone setting or the like, without the disadvantage of losing the convenience and comfort of a single foot pedal. The switch assembly, in accordance with the preferred embodiment, provides a capability for electrically switching a single foot pedal between tools in an automatic way, activated by merely lifting the shaft cable of the tool.

BRIEF DESCRIPTION OF THE DRAWINGS

Embodiments of the invention have been chosen for purposes of illustration and description, and are shown in the accompanying drawings, wherein.

Throughout the drawings, like elements are referred to by like numerals.

DETAILED DESCRIPTION OF PREFERRED EMBODIMENTS

Figure 1:
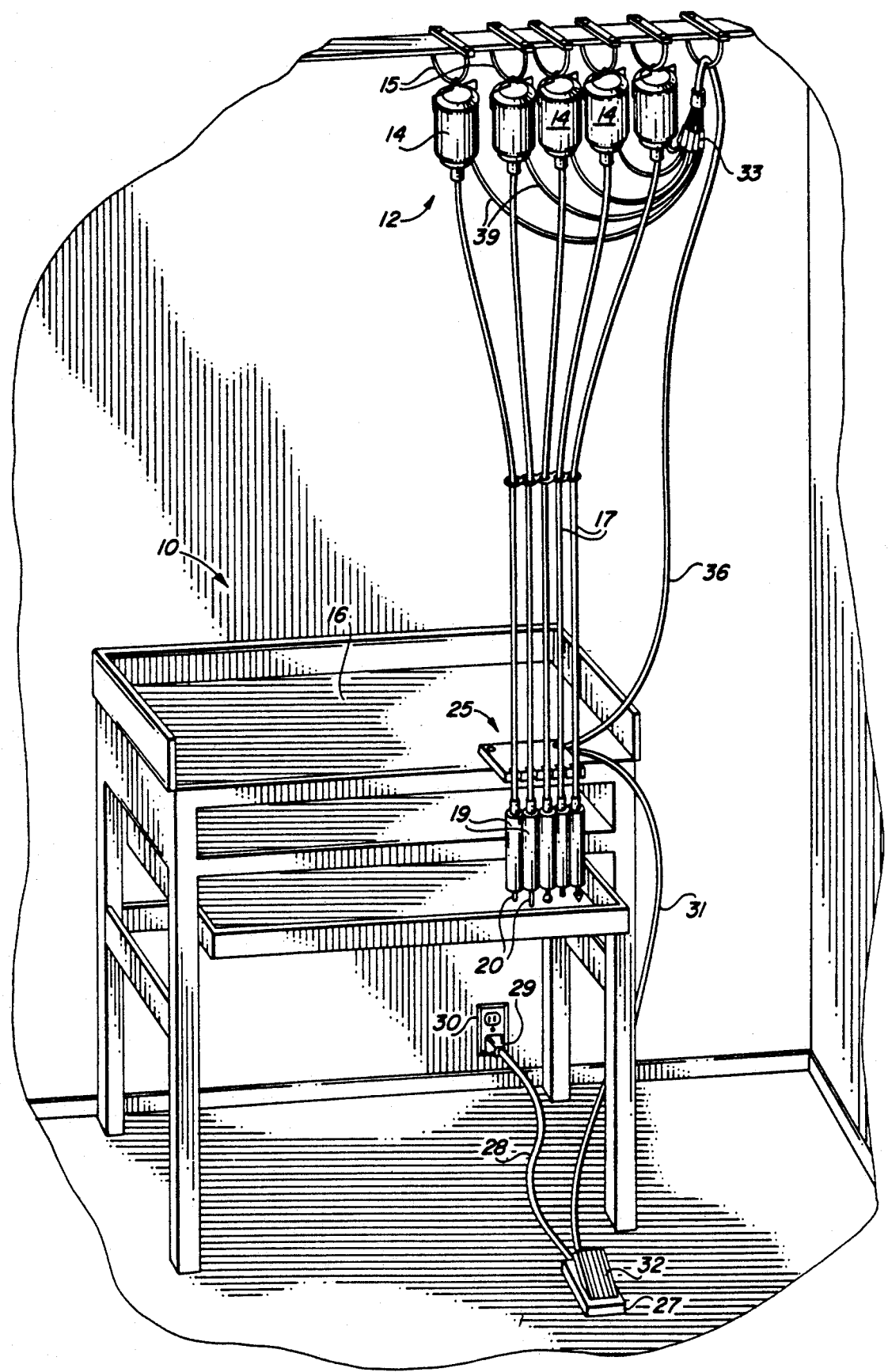
FIG. 1 is a overall view of a power tool set-up, utilizing the principles of the invention.

The principles of the invention are illustrated with reference to an exemplary implementation thereof in the form of a power tool set-up for a jeweler's bench 10, as shown in FIG. 1. The bench set-up includes a plurality of power tools 12, each comprising an electric motor 14, having means 15 for hanging the motor in an elevated relationship with respect to a bench working surface 16. Each tool 12 also includes a cable 17 housing a flexible shaft 18 driven by and depending from the associated motor 14. The motors 14 are supported in neighboring relationship, so that the respective cables 17 can be gathered into close relationship in a side-by-side array proximate the surface 16. The lower end of each cable 17 is outfitted with a handle 19 for receiving a tool bit 20 in conventional manner thereon.

In the shown embodiment, the bit 20 of each tool is configured to perform a different function. For example, for the shown cluster of five tools 12, the bits 20 may respectively be a round drill bit, a knife bit, a cup bit, a sandpaper bit, and a polishing bit. It will be appreciated, however, that the number of tools 12 can be varied and that the configurations of the different bits 20 are chosen to suit individual tastes and preferences. The tools 12 are hung so that the handles 19 descend to approximately the same location, with the handles 19 positioned in adjacent side-by-side relationships.

The motors 14, cables 17, handles 19 and bits 20 may be of conventional design, such as those available commercially under the Foredom name (e.g., Model No. C860673). In departure from conventional arrangements, however, the motors 14 are connected by means of a switch assembly 25 to be selectively powered by a common foot pedal switch 27. The switch 27 may be of known design, such as a Model No. 29872 pedal switch available from Pfingst & Co., Inc., South Plainfield, N.J. The pedal 27 includes a power cord 28 having a standard two- or three-prong male electrical connector 29 which connects to the corresponding female parts of a power supply wall outlet 30. The pedal switch 27 functions to deliver electrical power from the outlet 30 to a pedal output cord 31, in accordance with the amount of depression applied by the user to the pedal arm 32.

In convention power tool set-ups of the type to which the invention relates, a separate pedal switch 27 is individually connected to each one the motors 14. The inventive arrangement, however, utilizes a single pedal switch 27 and means for selectively electrically connecting that single pedal commonly to all the motors 14.

Figure 2:
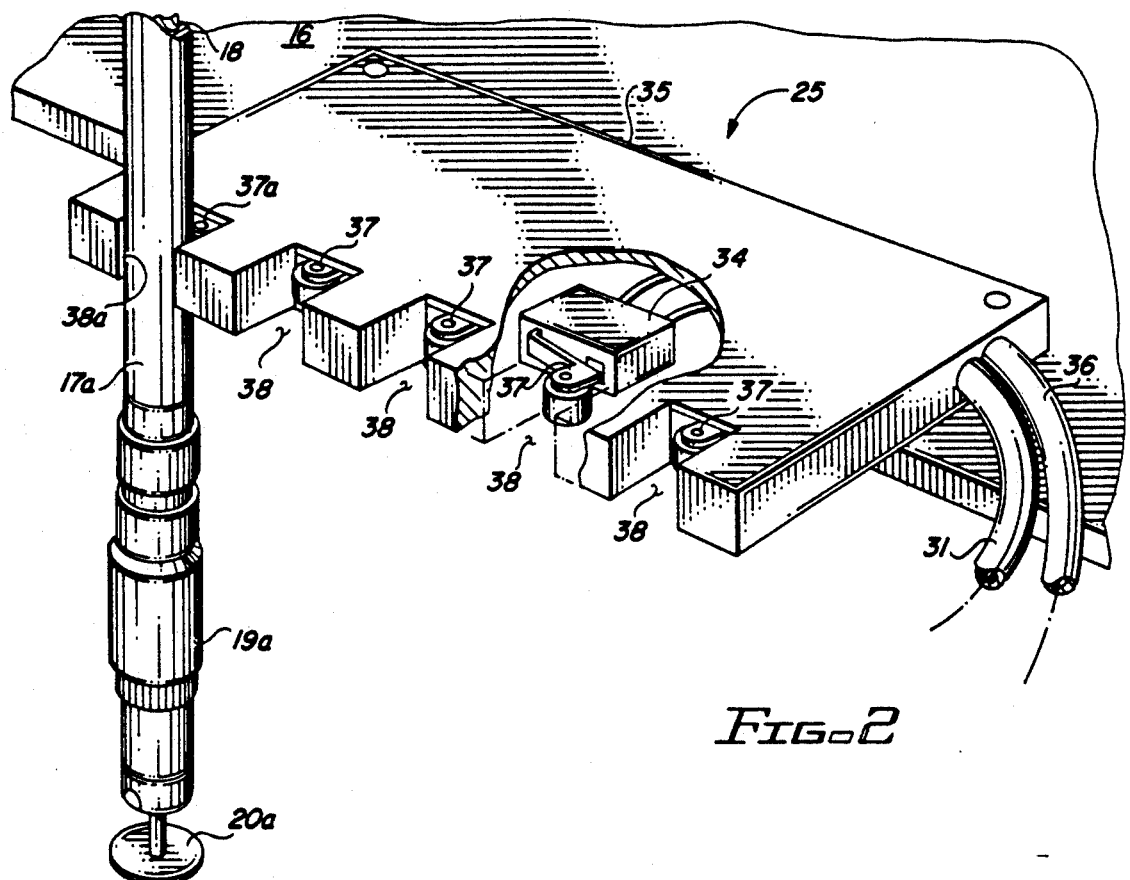
FIG. 2 is a cutaway view of the switch assembly of the set-up of FIG. 1.

As shown in FIG. 2, switch assembly 25 comprises a plurality of relays or switch elements 34 contained within a switching housing 35, and each having a spring-loaded arm 37 biased to project outwardly from the housing into a respective one of a plurality of recesses 38 formed in the housing 35. The housing 35 is advantageously formed in a flat, planar configuration suitable for positioning horizontally adjacent an edge of the work surface 16 (FIG. 1). The recesses 38 are dimensioned, configured and adapted for receiving lo corresponding ones of the cables 17, vertically extending therethrough. The switch elements 34 are positioned relative to the recesses 38, so that the arms 37 are moved between switch opened and switch closed positions in response to insertion into and removal from the associated recess 38 of the corresponding cable 17. The output sides of the elements 34 are connected to the motors 14 by means of a switch output cord 36 which terminates in a plurality of plugs 33 that respectively connect with motor input cords 39.

Figure 3:
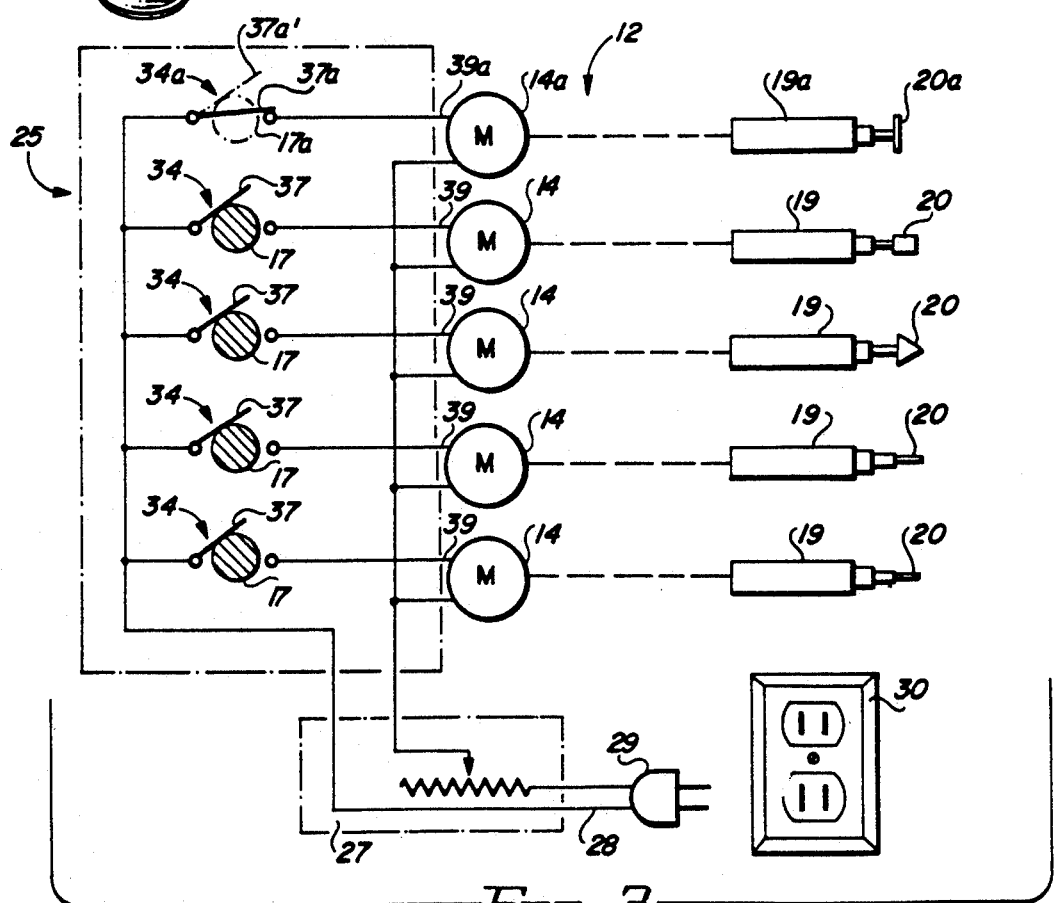
FIG. 3 is a schematic diagram of the electrical circuit of the set-up of FIG. 1.

As shown in FIG. 3, the switch elements 34 are connected with respect to the pedal 27 and the motors 14, so that removal of a particular cable 17a from a recess 38a (movement from the dot-dashed line position in FIG. 3), will cause the arm 37a of switch element 34a to spring into the now unoccupied recess 38a (to the solid line position of 37a shown in FIG. 3), thereby closing the switch 34a to electrically connect the motor 14a through motor input cord 39a, to be powered by the pedal 27. Replacement of the cable 17a within the recess 38a will, by force of the weight of the cable, move the arm 37a back to its switch open position (dot-dashed position 37a' in FIG. 3), thereby disconnecting motor 14a from the powering action of pedal 27. The switch elements 34 may take any one of various forms, such as 111SM2-T 8144 or 8227 switches available from Micro Company.

The motors 14 are arranged in elevated positions so that the lower ends of cables 17 can be gathered in one-to-one correspondence within the recesses 38 of assembly 25, with the assembly 25 positioned so that the weight of the cables 17 will normally depress the respective arms 37 into their switch opening positions. When a selected cable 17 is removed from its associated recess 38 by lifting the handle 19 carrying the desired bit 20, the corresponding arm 37 will spring out to close the switch element 34, to connect the corresponding motor 14, so that the lifted bit 20 can be operated by the foot pedal 27. When a different bit 20 function is desired, the cable 17 of the first bit is replaced in its recess 38, thereby disconnecting the first motor 14 from the foot pedal 37. The cable 17 connected to the handle 19 of a desired second bit 20 is then removed from its recess 38, thereby automatically connecting the motor 14 associated with the second bit 20 for controlled actuation by the same pedal 27. Likewise, control of any other selected bit 20 by the same foot pedal 27 can be automatically initiated by merely lifting the associated handle 19, removing the corresponding cable 17 from its recess 38.

Those skilled in the art to which the invention relates will appreciate that other substitutions and modifications can be made to the described embodiment without departing from the spirit and scope of the invention as described by the claims below.

What is claimed is:

1. A power tool set-up for a jeweler's workbench or the like, said set-up comprising, in combination:
   a plurality of power tools, each tool including an electrical motor, a rotary bit, a cable, and a flexible shaft housed in said cable and connecting said bit to be driven by said motor;
   a foot pedal having a pedal arm, a pedal output element, and means for delivering electrical power from a source of electrical power to said pedal output element in accordance with positioning of said pedal arm; and
   a switch assembly;
   said power tool cables being normally positioned in contact with said switch assembly, said motors being normally electrically disconnected from said foot pedal output element, and said switch assembly including means for sensing the movement of a selected one of said cables out of contact with said switch assembly, and means for electrically connecting said foot pedal output element to said motor corresponding to said selected cable in response to said sensing of said out-of-contact movement, for powering said corresponding motor under control of said positioning of said pedal arm.

2. A set-up as in claim 1, wherein said switch assembly comprises:
   a housing having a plurality of recesses shaped for removably receiving said cables respectively therein;
   a plurality of switch output elements respectively connected to deliver power to said motors; and
   a plurality of switching elements all commonly connected to receive power from said pedal output element and respectively connected to deliver power to said switch output elements, said switching elements comprising arms and biasing means respectively positioned relative to each other and to said recesses, so that receipt of one of said cables within one of said recesses will move the corresponding one of said arms to a switch-open position wherein said pedal output element is taken out of power delivering communication with the corresponding one of said switch output elements, and removal of said one of said cables from said one of said recesses will move said corresponding one of said arms to a switch-closed position wherein said pedal output element is placed into power delivering communication with said corresponding one of said switch output elements.

3. A set-up as in claim 2, wherein said cables have upper ends connected to said motors and lower ends; and said motors are arranged in elevated positions relative to said switch assembly so that said lower ends of said cables can be gathered in one-to-one correspondence within said recesses, and so that said arms will be normally depressed into said switch-open positions by weight of said cable lower ends.

4. A set-up as in claim 1, wherein said bit of each tool is configured to perform a different function.

5. A set-up as in claim 4, wherein said plurality of power tools comprises five tools, and said bits respectively comprise a round drill bit, a knife bit, a cup bit, a sandpaper bit and a polishing bit.

6. A power tool set-up comprising, in combination:

a workbench with a working surface;

a plurality of power tools, each tool including an electrical motor, means hanging said motor in elevated relationship with respect to said working surface, a rotary bit, a cable having a lower end depending from said motor, and a flexible shaft housed in said cable and connecting said bit to be driven by said motor; said motors of said plurality of tools being supported in neighboring relationship so that said lower ends of said cables can be gathered into close relationship in a side-by-side array proximate said working surface;

a foot pedal having a pedal arm, a pedal output element, and means for delivering electrical power from a source of electrical power to said pedal output element in accordance with positioning of said pedal arm; and a switch assembly;

said power tool cable lower ends being normally positioned in contact with said switch assembly, said motors being normally electrically disconnected from said foot pedal output element, sand said switch assembly including means for sensing the movement of a selected one of said cable lower ends out of contact with said switch assembly, and means for electrically connecting said foot pedal output element to said motor corresponding to said selected cable lower end in response to said sensing of said out-of-contact movement, for processing said corresponding motor under control of said positioning of said pedal arm.

7. A set-up as in claim 6, wherein said switch assembly comprises:

a housing located proximate said working surface, said housing having a plurality of recesses shaped for removably receiving said cable lower ends respectively therein;

a plurality of switch output elements respectively connected to deliver power to said motors; and a plurality of switching elements all commonly connected to receive power from said pedal output element and respectively connected to deliver power to said switch output elements, said switching elements comprising arms and biasing means respectively positioned relative to each other and to said recesses, so that receipt of one of said cable lower ends within one of said recesses will move the corresponding one of said arms to a switch-open position wherein said pedal output element is taken out of power delivering communication with the corresponding one of said switch output elements, and removal of said one of said cable lower ends from said one of said recesses will move said corresponding one of said arms to a switch-closed position wherein said pedal output element is placed into power delivering communication with said corresponding one of said switch output elements.

8. A set-up as in claim 7, wherein said working surface has an edge, and said switch assembly housing is of flat, planar configuration and is positioned on said working surface, horizontally adjacent said edge.

9. A set-up as in claim 8, wherein said biasing means comprise springs connected to said arms so that receipt of said one of said cable lower ends within said one of said recesses will move said corresponding one of said arms to said switch-open position, by force of weight of said one of said cable lower ends.

10. A set-up as in claim 9, wherein said plurality of power tools comprises five tools, and said bit of each tool is configured to perform a different function.

* * * * *